A. A. GIRARD.
SPRING TIRE.
APPLICATION FILED MAR. 27, 1918.
1,291,477.
Patented Jan. 14, 1919.
2 SHEETS—SHEET 1.
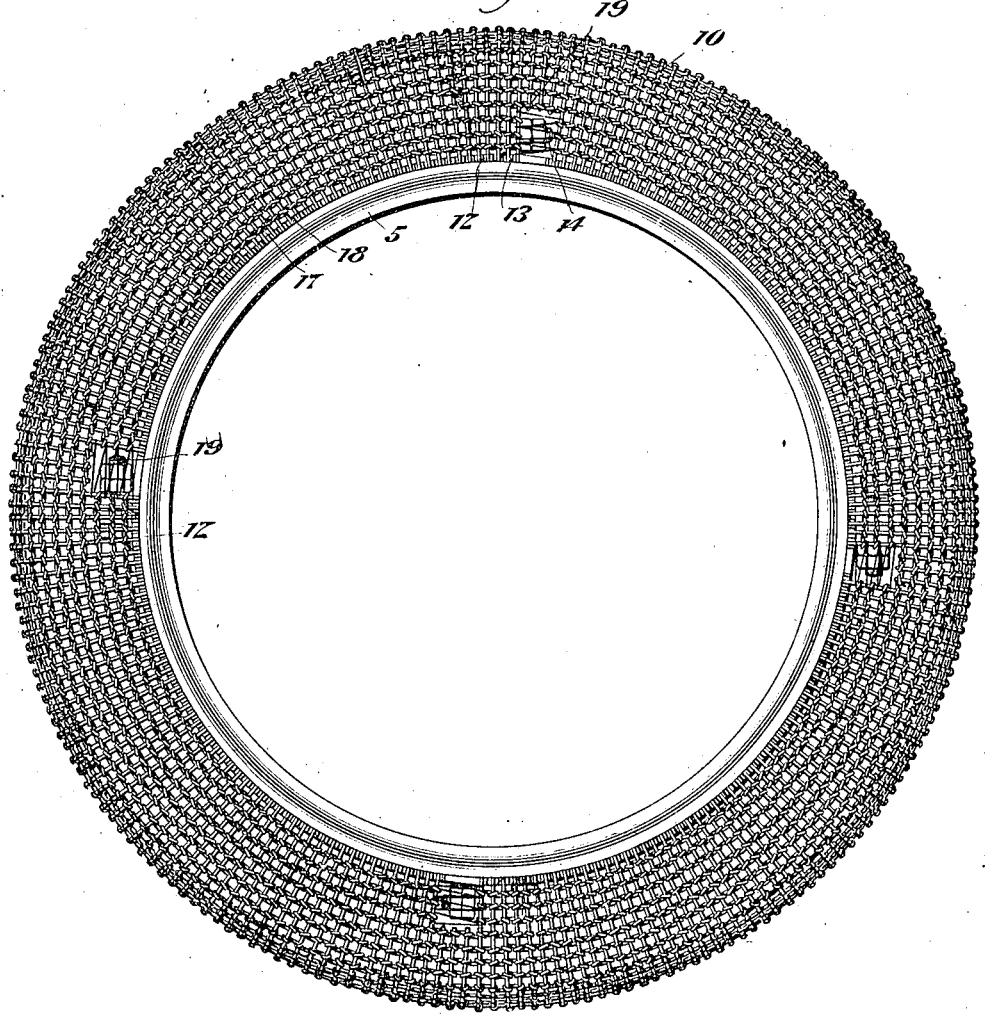
Witnesses
Inventor
Arthur A. Girard
By Victor J. Evans
Attorney

UNITED STATES PATENT OFFICE.

ARTHUR A. GIRARD, OF NEW HAVEN, CONNECTICUT.

SPRING-TIRE.

1,291,477. Specification of Letters Patent. Patented Jan. 14, 1919.

Application filed March 27, 1918. Serial No. 225,047.

*To all whom it may concern:*

Be it known that I, ARTHUR A. GIRARD, a subject of the King of Great Britain, residing at New Haven, in the county of New Haven and State of Connecticut, have invented new and useful Improvements in Spring-Tires, of which the following is a specification.

This invention relates to vehicle tires, particularly to those of the cushion type, and has for its object the provision of a metallic tire constructed entirely of spring wire having its strands interengaged to form a continuous body which will be puncture proof and which will still permit the maximum degree of resiliency.

An important object is the provision of a tire of this character comprising a strand of wire formed into radially extending convolutions so interengaged by a plurality of parallel circumferentially extending strands that relative displacement of any of the convolutions will be positively prevented.

A further object is the provision of a tire of this character having associated therewith a supporting rim provided with spaced transverse slots receiving the inner portions of the radial convolutions whereby circumferential creeping of the tire upon the rim will be prevented.

An additional object is the provision of novel securing means within the tire associated with the rim whereby the tire structure will be maintained in position thereon, means being provided for permitting access to the interior of the tire for adjusting and removing the securing means and to permit the extraction of stones and the like which might work into the tire.

Another object is the provision of a tire of this character which will be comparatively simple, durable in service, efficient in tractive power and a general improvement of the art.

With the above and other objects and advantages in view the invention consists in the novel construction and arrangement of parts to be hereinafter more fully described and claimed and illustrated in the accompanying drawings in which:

Figure 1 is an elevation of the complete assembled tire and rim.

Fig. 4 is a fragmentary plan of the rim and

Figure 2:
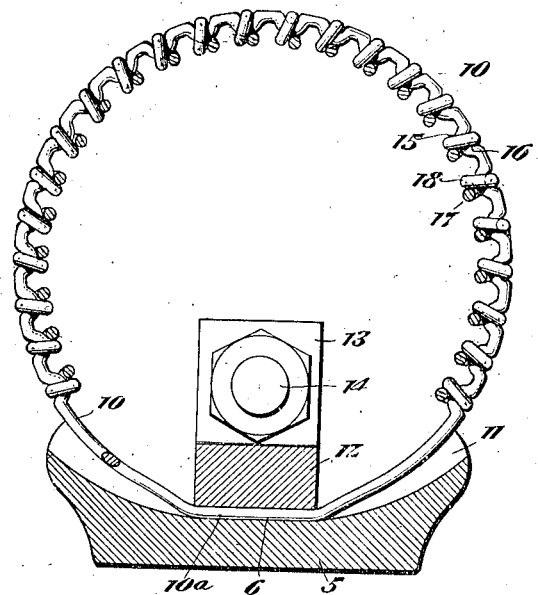
Fig. 2 is a cross sectional view through one side thereof.
Figure 3:
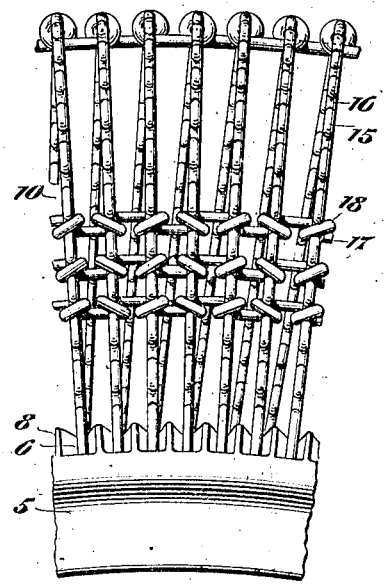
Fig. 3 is an enlarged fragmentary side elevation showing the coiling in detail.
Figure 5:
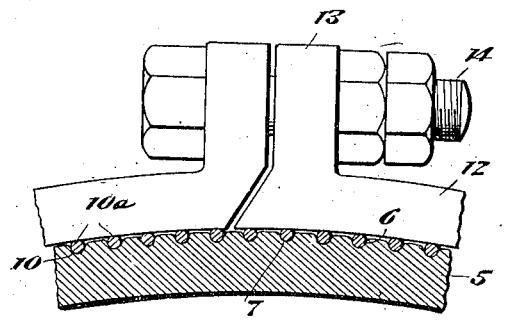
Fig. 5 is a fragmentary longitudinal sectional view through the rim and contacting portions of the securing bands and the convolutions.

Referring more particularly to the drawing the numeral 5 designates the supporting rim which is formed continuous and which is provided upon its outer periphery with a plurality of transverse slots 6 having their intermediate portions 7 formed with parallel walls and the outer ends formed with divergent walls 8 as shown clearly in Fig. 4 of the drawing, for a purpose to be hereinafter described. The outer periphery of the rim 5 is further formed concave as shown in Fig. 2 of the drawing and the curvature of the bottoms of the slots 6 is of greater radius than the curvature of the rim.

In carrying out the construction of my tire I provide a strand of wire coiled to provide a plurality of spaced convolutions 10 substantially circular in configuration and corresponding in number to the number of transverse slots 6. Each convolution 10 is disposed in a slot 6 and has a straight portion 10ª in engagement with the central straight portion 7 thereof and has its adjacent curved portions in spaced relation to the divergent sides of the slot. Within the portion 7 of the slot the convolution 10 contacts closely with the rim but as the radius of the convolutions is less than the radius of the curvature of the bottom of the slot a space 11 will be provided between the convolution and the adjacent end of the slot. The convolutions 10 are held associated with the rim 5 and prevented from displacement from the slots 6 by means of a retaining band formed of any desired number of sections 12, each section terminating in lugs 13 through which are passed securing bolts 14. The convolutions 10 are thus firmly clamped upon the rim.

The portion of each convolution 10 which projects beyond the rim is bent or kinked inwardly at intervals as shown at 15 to provide a plurality of depressions 16. These are in circumferential alinement throughout the periphery of the tire. Associated with the consequent rows of depressions 16 is a plurality of circumferentially extending spaced parallel strands 17 which are bent or looped about the convolutions 10 at the points of kinking, with the loops 18 disposed within the depressions 16. It will be seen that thus a rather closely arranged wire structure is provided, the parts of which are firmly interlocked whereby relative displacement is prevented.

In the course of travel of a vehicle equipped with my novel tire, upon encountering obstructions such as ruts, stones and the like, the convolutions 10 can readily flatten out until they engage the bottoms of the slots 6 thereby affording maximum initial resilience. It is of course understood that the convolutions can flatten still more in case of unusually severe strain upon them. The spacing of the convolutions from the diverging sides of the outer ends of the slots allows slight longitudinal movement of the sides of the tire in order that in case the vehicle is very quickly started or stopped the convolutions may properly seat within the slots. It will be noted however, that the convolutions 10 fit snugly within the central portions 7 of the slots whereby longitudinal creeping upon the tire will be absolutely prevented.

In order that access may be had to the bolts 14 for adjusting or removing the band sections 12, I provide openings 19 in the walls of the tire opposite each bolt for the insertion of a wrench. The openings are formed by cutting away the convolutions 10 and may be ordinarily closed by lacing them over with suitable wire. The holes further serve to permit inserting of a tool for scraping out any pebbles which might work into the tire.

From the foregoing description and a study of the drawings, it will be apparent that I have thus provided a metallic spring tire the parts of which are inter-locked against separation, which will be puncture and blowout proof which will not slip longitudinally or skid transversely on account of the wires, and which will have the maximum efficiency in points of resilience, strength and durability.

It will of course be understood that I reserve the right to make such changes in the form and construction of parts as will not depart from the spirit of the invention nor the scope of the subjoined claims.

Having thus described my invention I claim:—

1. A spring tire comprising a plurality of substantially circular radially extending wire convolutions, and a plurality of circumferentially disposed parallel strands coiled about each of said radial convolutions.

2. In combination with a supporting rim provided in its face with a plurality of transverse slots, a spring tire comprising a plurality of radially extending convolutions disposed within said slots, and a plurality of spaced parallel circumferentially disposed strands coiled about said radial convolutions.

3. In combination with a supporting rim, a spring tire comprising a plurality of radially disposed substantially circular convolutions secured upon said rim, the portions of said radial convolutions extending beyond the rim being kinked at intervals, and a plurality of spaced parallel circumferentially disposed strands coiled about the kinked portions of each of said radial convolutions.

4. In combination with a supporting rim having its outer periphery concaved and provided with a plurality of transverse slots having their bottoms curved on a greater radius than the curvature of the concavity of the rim, a spring tire comprising a plurality of radially extending convolutions disposed in said slots and having the same radius as the curvature of the concavity in the rim, whereby said convolutions will be spaced from the outer ends of said slots and compressible thereinto by pressure upon the tire and a plurality of circumferential strands connected with said radial convolutions.

5. In combination with a supporting rim provided on its outer periphery with a plurality of transverse slots, a plurality of radially extending convolutions disposed within said slots, means for retaining said convolutions within said slots, and a plurality of circumferentially disposed strands coiled about said convolutions.

6. In combination with a supporting rim provided on its outer periphery with a plurality of transverse slots having flaring ends, a plurality of radially extending convolutions disposed within said slots, and a plurality of circumferentially extending strands coiled about said convolutions.

7. In combination with a supporting rim having its outer periphery provided with a plurality of transverse slots having the ends of their walls divergent, a plurality of convolutions disposed within said slots, each convolution having a straight portion closely engaged within the central portion of a slot and having its adjacent curved portions disposed in spaced relation to the divergent ends of the slot, and a plurality of strands concentric with said supporting rim and coiled about said convolutions.

8. In combination with a supporting rim provided in its outer periphery with a plurality of transversely extending arcuate slots, a plurality of radially extending convolutions disposed within said slots and having a curvature less than the curvature of said slots whereby the central portions of the slots will be closely engaged by said convolutions and the ends of the slots spaced from the convolutions, and a plurality of circumferentially extending strands concentric with said supporting rim and coiled about said convolutions.

In testimony whereof I affix my signature.

ARTHUR A. GIRARD.